Figure 1:
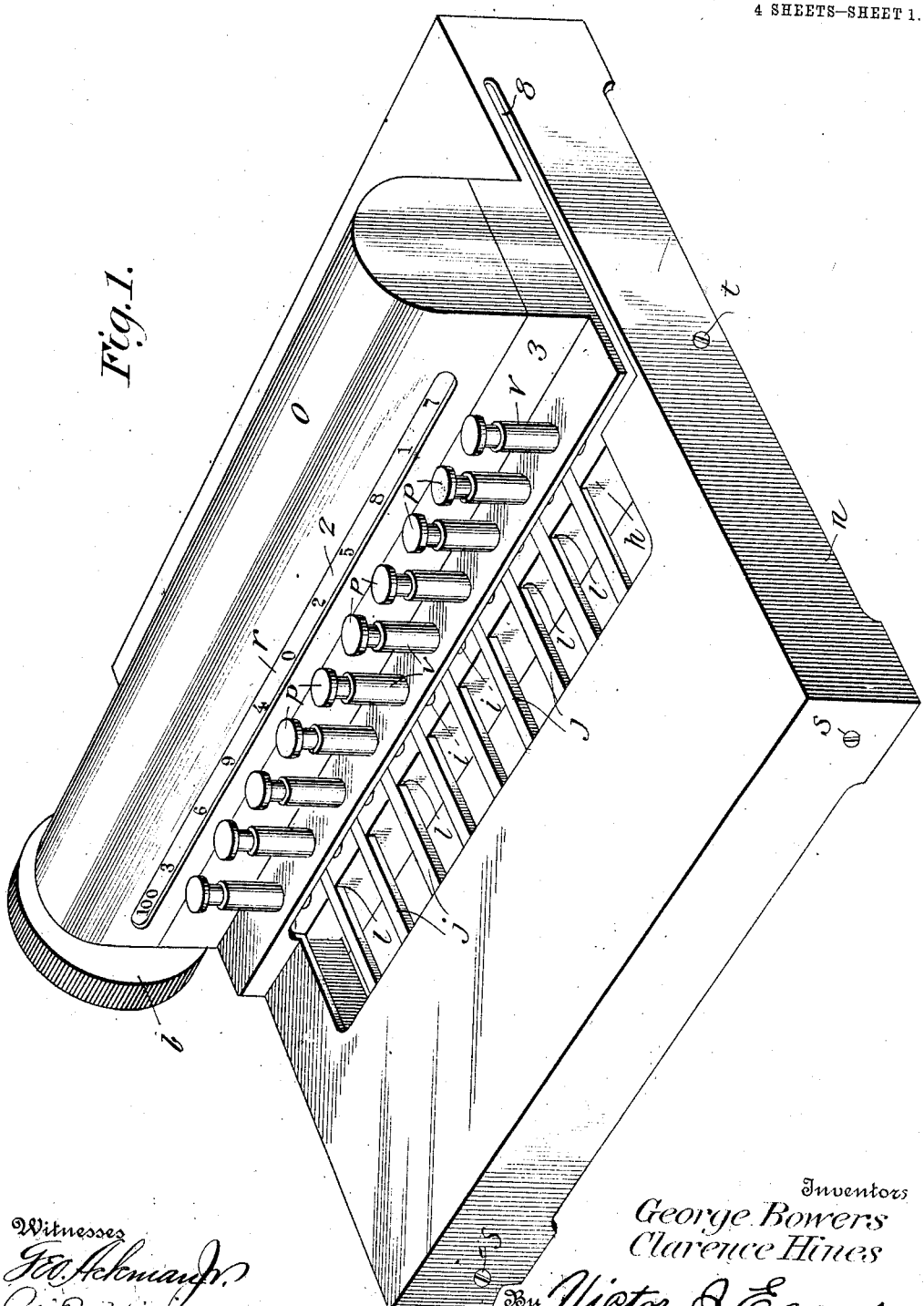

C. HINES & G. BOWERS.
CHECK PROTECTING MACHINE.
APPLICATION FILED SEPT. 30, 1911.

1,034,238.

Patented July 30, 1912.
4 SHEETS—SHEET 1.

Witnesses
Geo. Ackman Jr.
C. B. Hillyard

Inventors
George Bowers
Clarence Hines
By Victor J. Evans
Attorney

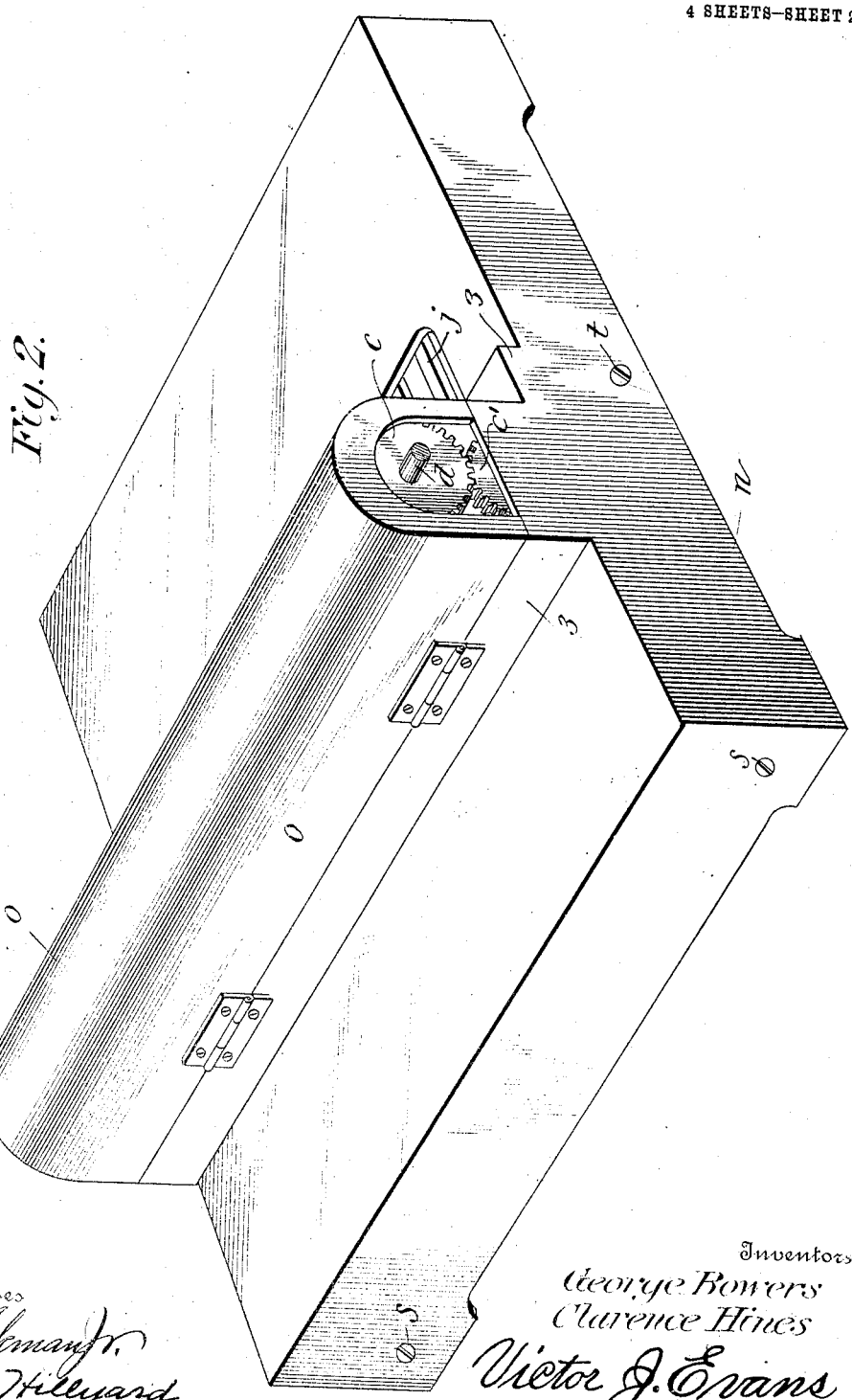

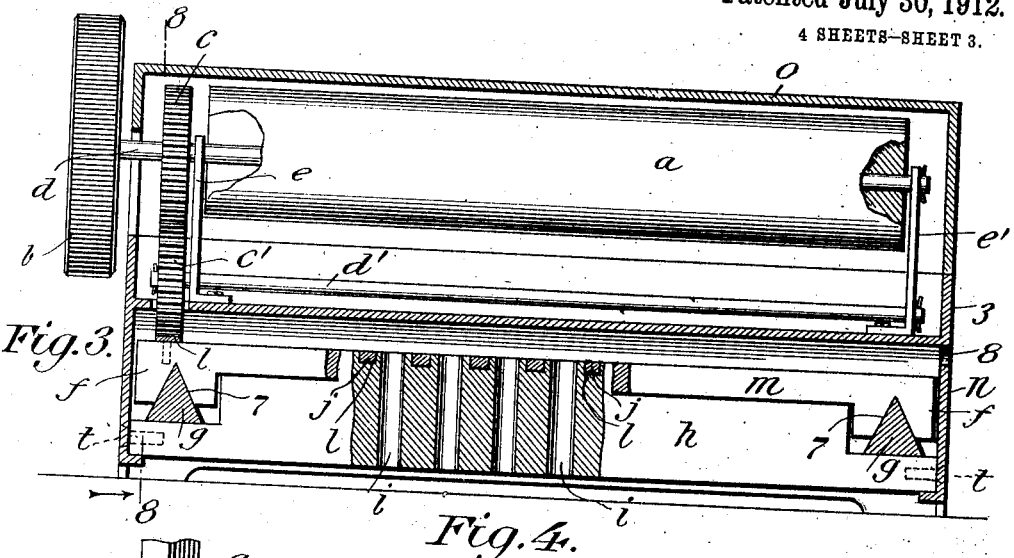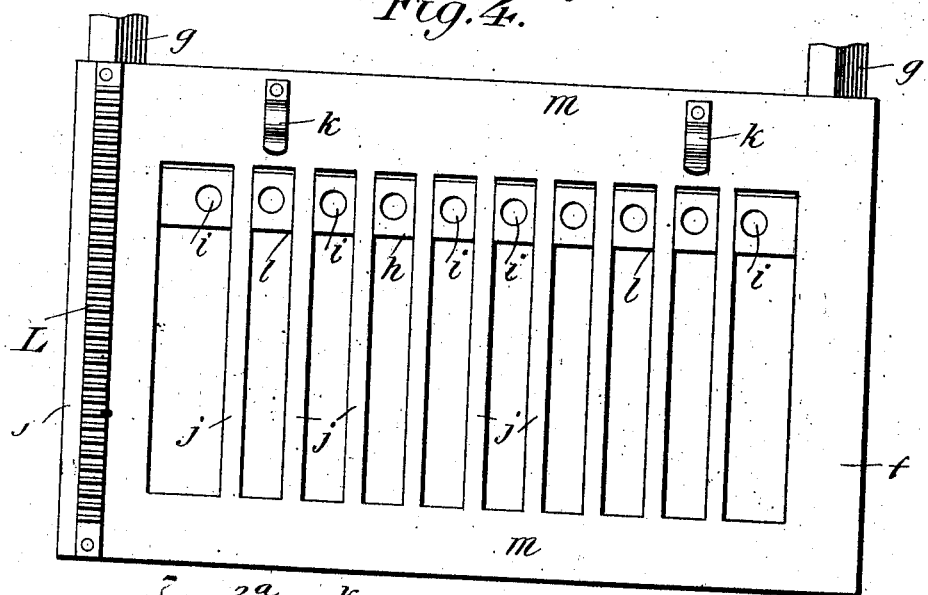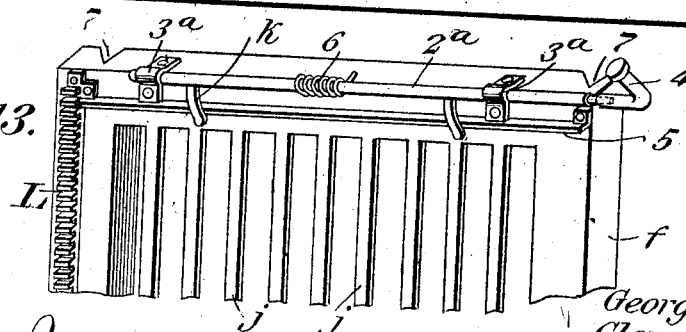

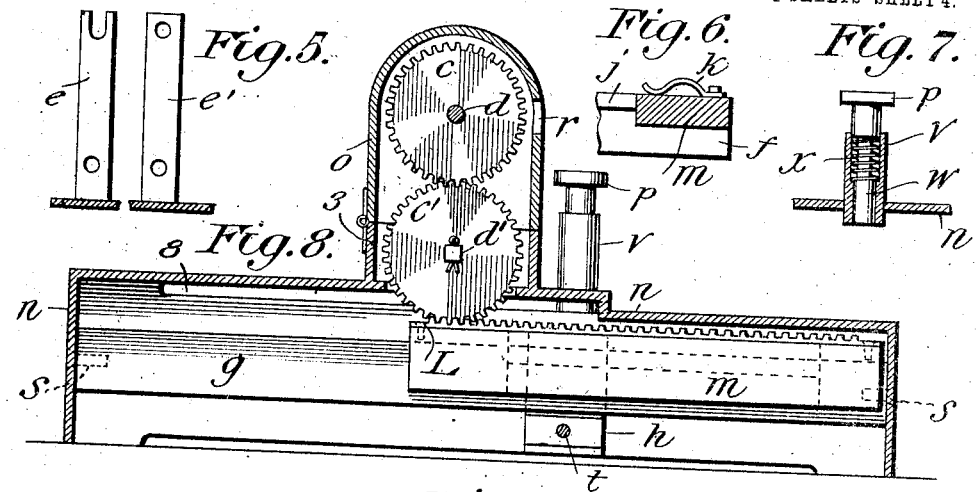

UNITED STATES PATENT OFFICE.

CLARENCE HINES AND GEORGE BOWERS, OF SAN QUENTIN, CALIFORNIA.

CHECK-PROTECTING MACHINE.

1,034,238.

Specification of Letters Patent.

Patented July 30, 1912.

Application filed September 30, 1911. Serial No. 652,193.

*To all whom it may concern:*

Be it known that we, CLARENCE HINES and GEORGE BOWERS, citizens of the United States, residing at San Quentin, in the county of Marin and State of California, have invented new and useful Improvements in Check-Protecting Machines, of which the following is a specification.

This invention provides a machine for punching negotiable paper in a manner to prevent forging or the raising of the amount, thereby safeguarding the maker as well as the party or concern upon whom the order is drawn.

The invention has relation primarily to check protecting devices in which the method employed is similar to that known as the code card identifying method, the objects being to provide a machine which is simple in mechanism, small in size, light in weight and which may be manufactured at a comparatively small cost; to provide a machine which offers a method of check protection which will guard against the raising or the forging of a check or like paper; to provide a machine which embodies a single line of punches, usually ten, one for each digit; to provide a machine which may be readily manipulated by means of a hand piece such as a milled wheel to bring the check or other paper in proper position for punching the openings therein according to the predetermined code, and to supply a machine which will admit of the code card being readily changed so that a departure from the original code may be adopted should the same be deemed advisable for any reason.

The invention consists of the novel features, details of construction and combination of parts, which hereinafter will be more particularly set forth, illustrated in the accompanying drawings, and pointed out in the appended claims.

Referring to the drawings, forming a part of the specification, Figures 1 and 2 are respectively obverse and reverse perspective views of a check punching machine embodying the invention. Fig. 3 is a front view, partly in section and having parts broken away. Fig. 4 is a top plan view of the check support and the punch die, showing the tracks upon which the check support is mounted to move. Fig. 5 is a detail view in elevation of the standards in which the shafts are mounted. Fig. 6 is a sectional view of part of the check support, showing the spring clips or holder for retaining the check or like paper in position. Fig. 7 is a view in elevation of one of the punches, showing the guide therefor in section. Fig. 8 is a longitudinal section of the machine on the line 8—8 of Fig. 4, looking to the right, as indicated by the arrow. Fig. 9 is a view in elevation of the punch die. Fig. 10 is a plan view of the code cylinder. Fig. 11 is an end view of the roller having the code cylinder in place thereon. Fig. 12 is a plan view of the code card. Fig. 13 is a detail perspective view of part of the check support, showing a modified form of check holder and a check stop.

Corresponding and like parts are referred to in the following description, and indicated in all the views of the drawings, by the same reference characters.

The framework of the machine embodies a base $n$ and an upright portion $o$ both being hollow to receive the working parts. Within the base two bars $g$ are located forming tracks upon which the check support is mounted to slide. The tracks $g$ consist of bars of triangular form in end view, said bars being secured to the front and to the back of the base by means of screws or fastenings $s$. A punch die $h$ is located about midway between the front and the back of the base and is secured at its ends to the sides thereof by means of screws or fastenings $t$. The end portions of the punch die are reduced to afford clearance for the tracks $g$. A plurality of vertical openings $i$ are formed in the punch die and correspond in position and number with the several punches. A plurality of grooves $l$ are formed in the upper side of the punch die to receive the spaced elements $j$ of the check support. The punch die preferably consists of a bar of steel or case-hardened metal so as to coöperate with the punches and resist wear.

The check support consists of an oblong frame or plate and is provided upon its under side near opposite ends with grooves 7 to receive the upper edges of the V-shaped tracks $g$. The check support is slidable upon the track over the punch die and comprises end bars $f$, front and rear bars $m$ and intermediate spaced elements $j$ consisting of strips which are arranged to come between the openings $i$ of the punch die and to enter the grooves $l$ and come flush with the upper side of said punch die. The rear bar or element of the check support is provided with spring clips or holders $k$ to engage with and retain the check or like paper in position during the punching operation. The check support is adapted to be moved backwardly and forwardly upon the track in any manner and for convenience a rack bar L is located upon an end portion of the check support and meshes with a gear wheel $c'$ fastened to an end portion of a shaft $d'$. The gear wheel $c'$ meshes with a companion gear wheel $c$ fastened to an end portion of a shaft $d$ paralleling the shaft $d'$, both shafts being mounted in standards $e$ $e'$ which are secured to the base portion of the machine. The shaft $d$ is provided at one end with a hand piece or milled wheel $b$. The bearing at the upper end of the standard $e$ for the shaft $d$ is open, thereby admitting of the shaft $d$ being easily and quickly placed in position or removed, this being of advantage since it admits of the code cylinder 2 being easily and quickly placed in position or removed from the roller $a$ mounted upon the shaft $d$. The shafts $d$ $d'$, the standards $e$ $e'$ and the gear wheels $c$ $c'$ are inclosed by the upright portion of the frame, said upright portion comprising a hood or cover $o$ and a raised portion 3, the latter projecting upwardly from the base a short distance and the hood or cover $o$ being hinged thereto. A longitudinal slot $r$ is formed in a side of the hood or cover $o$ to expose a line of numerals or letters corresponding to the position of the identifying characters of the code card and cylinder. The code cylinder interlocks with the roller $a$ when in place thereon and for this purpose has a tongue $u$ upon its inner side to enter a corresponding groove formed longitudinally of the roller $a$. The code cylinder like the code card is provided with a line of letters and lines of numerals, the letters corresponding with initials selected to identify the drawer or maker of a check or other negotiable paper and the several lines of numerals corresponding to the units, tens, hundredths, thousandths, etc., for indicating the amount for which the check, note, draft or like is drawn or made. The letters corresponding with the code and the numerals with the units, tens, etc. By having the code cylinder detachably fitted to the roller $a$ the code may be changed at will.

The punches $p$ are located in a straight line transversely of the machine above the punch die $h$ and in front of the vertical portion of the frame. Each punch operates in a guide V which is secured in any manner to the frame. A helical spring $x$ normally holds the punch elevated. The lower portion $w$ of the punch is made hollow, thereby providing a sharp edge which readily cuts through the check or other paper. A single line only of punches is provided and in the preferable construction ten punches are employed, one punch for each digit from one to ten. The punches correspond in position to the position of the letters and numbers around the code cylinder.

In the operation of the invention the check, draft, money order or other negotiable paper to be punched is placed upon the check support and held in position thereon by means of the clips or holders $k$, after which the code cylinder is turned by means of the hand piece or milled wheel $b$, thereby bringing the check support and the check thereon in proper position for punching according to the code and the amount to be indicated. When the cylinder is moved to a position to bring the letters opposite the slot $r$ of the hood or cover $o$ the check or other paper is in position for receiving punch openings corresponding with the initials or other identifying character of the drawer or maker of the paper, such as the check, draft, or the like. The check or like paper is punched by operating the punches corresponding with the letters appearing in the slot $r$ corresponding to the code. The code cylinder is again operated to bring the line of numerals opposite the slot corresponding to the highest figure appearing upon the check or like paper when the punch is depressed corresponding with said figure. The code cylinder is again operated to bring the next line of numbers in position opposite the slot $r$ corresponding with the next highest amount of the check and so on until punches are made corresponding with the units, tens, hundredths and thousandths, according to the amount for which the check is drawn. When the check is presented for payment the teller compares the check with the code card and if the identifying code and numerals appearing through the punch openings of the check correspond with the data appearing on the face of the check the same is honored, but should a discrepancy appear the paper is rejected. The movement of the check support corresponds with the movement of the code cylinder because of the intermeshing gearing $c$ $c'$ and L.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claims appended hereto.

As shown in Fig. 13 the check holders $k$ are attached to a shaft 2ª mounted in bearings formed by straps 3ª attached to the check support f. A spring 6 is mounted on the shaft 2ª and exerts a pressure to hold the clips k on the support. A handle 4 is fitted to a reduced end of the shaft 2ª for convenience of operating the holder. By having the handle 4 detachable the parts may be easily assembled. A stop 5 engages the upper edge of the check and limits its movement when placed in position.

A slot 8 is formed in the right hand side of the base n to receive the end portion of a check or like paper when the same is of a length to project beyond the side of the base so that the check may be properly positioned in placing it in the machine for receiving punch openings.

Having thus described the invention what is claimed as new, is:—

1. In a machine for punching negotiable paper such as bank checks and drafts in accordance with a code card identifying system, the combination of a movable check support, a stationary punch die, punches adapted to coöperate with the punch die, a code cylinder, and intermeshing gearing between the code cylinder and check support whereby both are caused to move simultaneously and in definite relation corresponding with the indications upon a code card.

2. In a mechanism of the character described for punching negotiable paper in accordance with a predetermined code card system, the combination of a fixed punch mechanism, a movable check support for receiving the negotiable paper, a roller, a code cylinder detachably fitted upon the roller and provided with matter corresponding with the code card, means for rotating said roller to bring the required matter on the code cylinder in position for correctly locating the check with reference to the punching mechanism and intermeshing gearing between the roller and check support, whereby both receive a simultaneous movement in definite relation.

3. In a machine of the character described for punching negotiable paper such as checks, drafts and the like in accordance with a code card system, the combination of a fixed punching mechanism, a check support slidably mounted, a roller, intermeshing gearing between the roller and check support whereby both receive a simultaneous movement, a code cylinder removably fitted upon the roller, and means for fixing the position of the code cylinder upon the roller and preventing turning of said cylinder upon the roller.

4. In a machine of the character described, the combination of a fixed punch die, a plurality of punches in coöperative relation with the punch die, a check support slidably mounted with reference to the punches and punch die and comprising spaced elements located opposite the spaces formed between the punches for properly supporting the check or like negotiable paper, a roller provided with identifying matter corresponding with the code card of a check identifying system, and intermeshing gearing between the said roller and check support whereby movement imparted to one causes a simultaneous and corresponding movement of the other.

5. A machine for punching checks, drafts and other negotiable paper, the same comprising a relatively fixed check punching mechanism, a slidably mounted check support, a roller provided with identifying matter corresponding with the code card of a check identifying system, and means for properly positioning the check support and roller to correspond with the identifying matter of the code card, the same embodying intermeshing gearing between the said roller and check support whereby both are caused to move in unison.

6. In a check punching machine of the character set forth, the combination of a track, a check support slidably mounted upon the track and comprising spaced elements, a punch die having grooves to receive the spaced elements of the check support, a plurality of punches located upon the opposite side of the check support from the punch die, a roller provided with identifying matter corresponding with that of the code card of a check identifying system, and intermeshing gearing between said roller and the check support whereby both are caused to move simultaneously to insure proper positioning of the punch openings in the check according to the matter appearing upon the identifying code card.

7. A check identifying punch comprising a frame, a track, a punch die having grooves, a check support slidably mounted upon the track and comprising spaced elements to operate in the grooves of the punch die, a series of punches located above the punch die and check support, a roller, intermeshing gearing between the roller and check support, a code cylinder removably fitted upon the roller, and a cover for inclosing the code cylinder and having a slot therein for exposing a line of the identifying matter.

In testimony whereof we affix our signatures in presence of two witnesses.

CLARENCE HINES.
GEORGE BOWERS.

Witnesses:
DANIEL SULLIVAN,
J. H. MURRAY.